United States Patent Office 3,822,183
Patented July 2, 1974

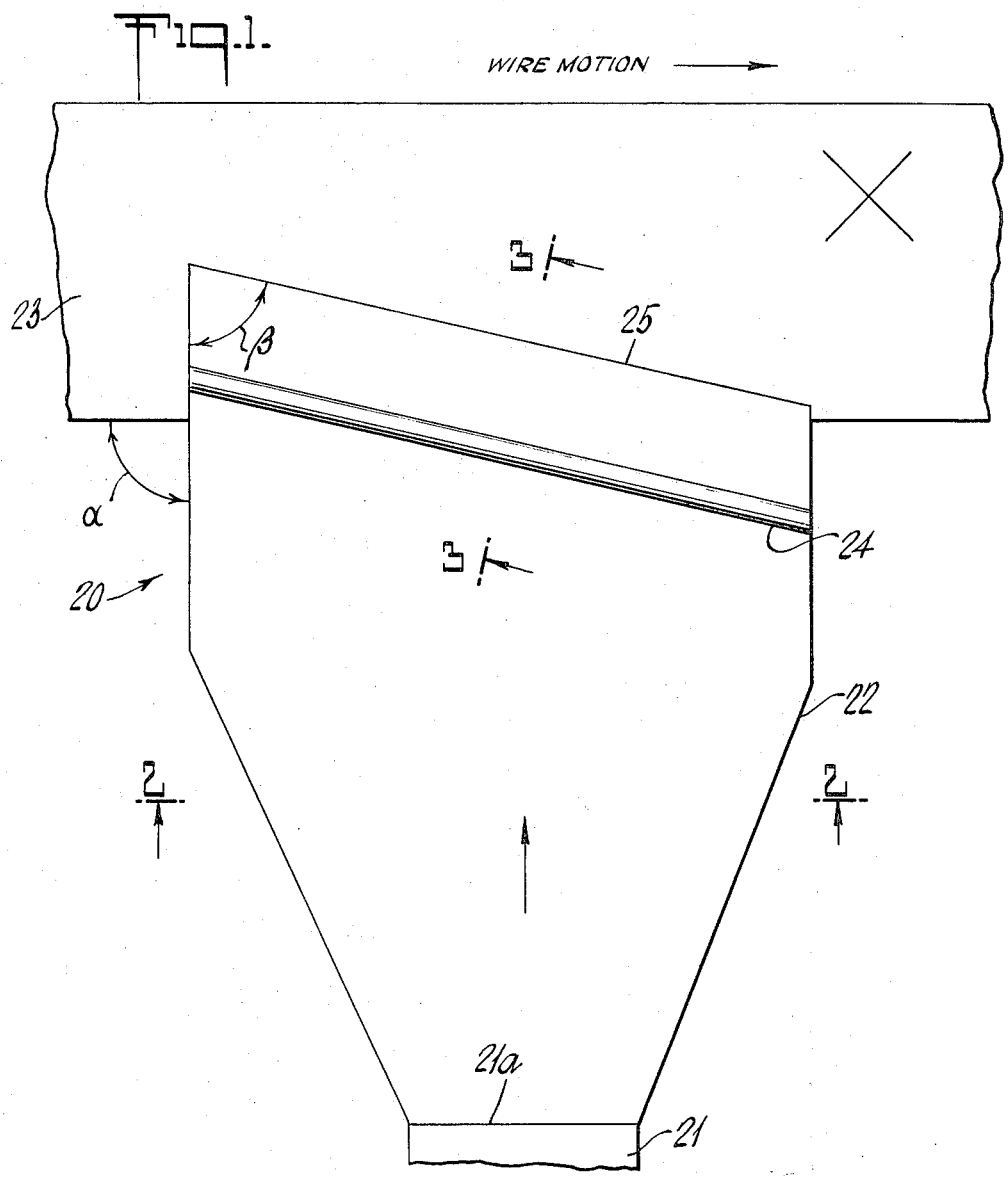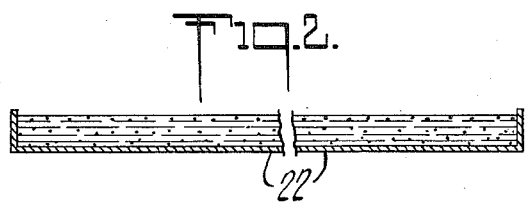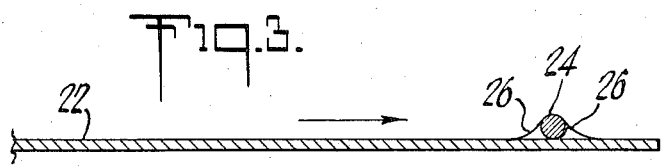

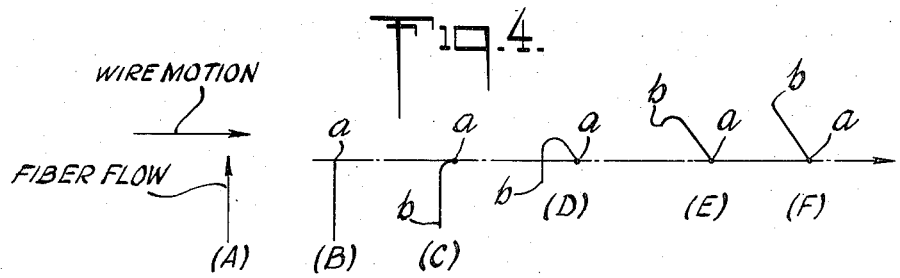
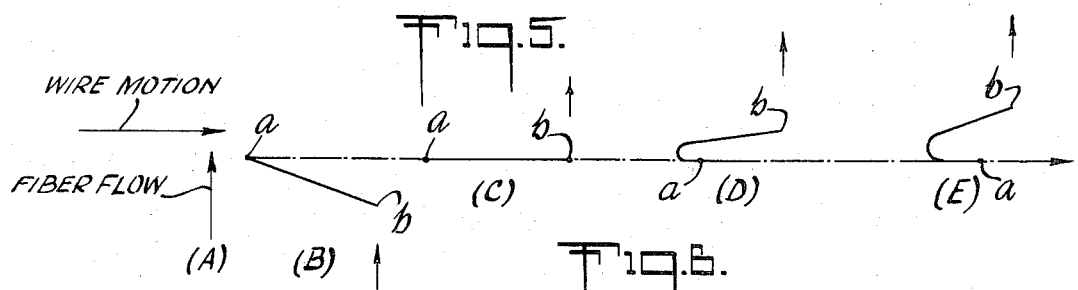
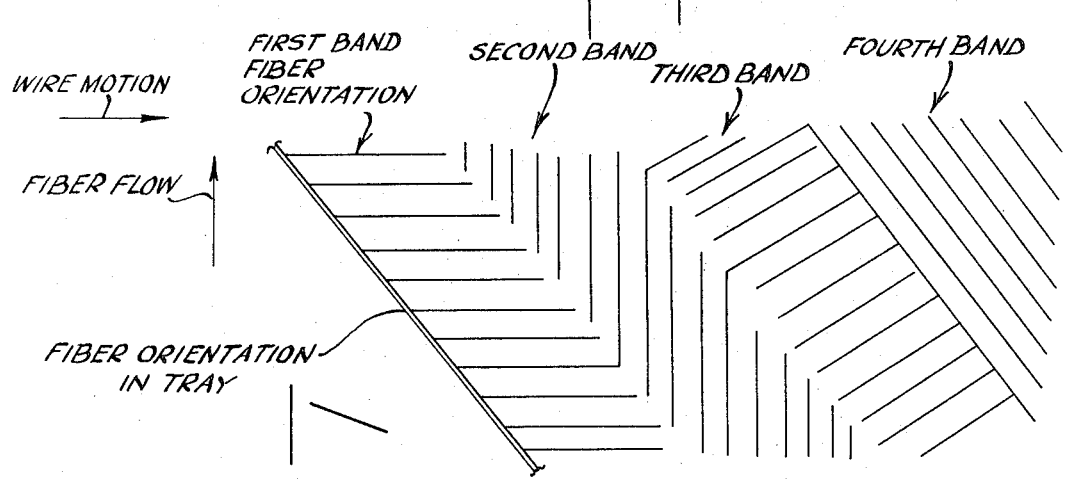
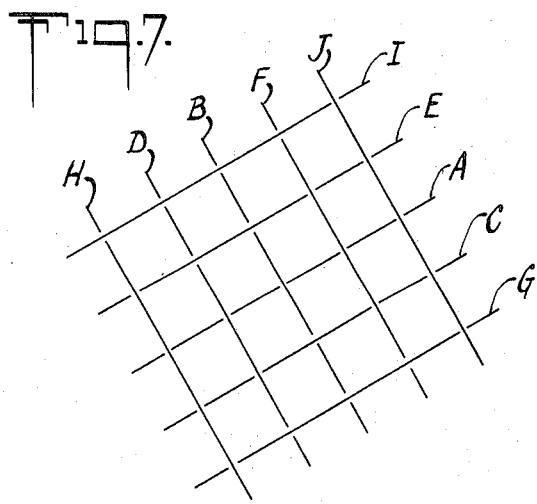

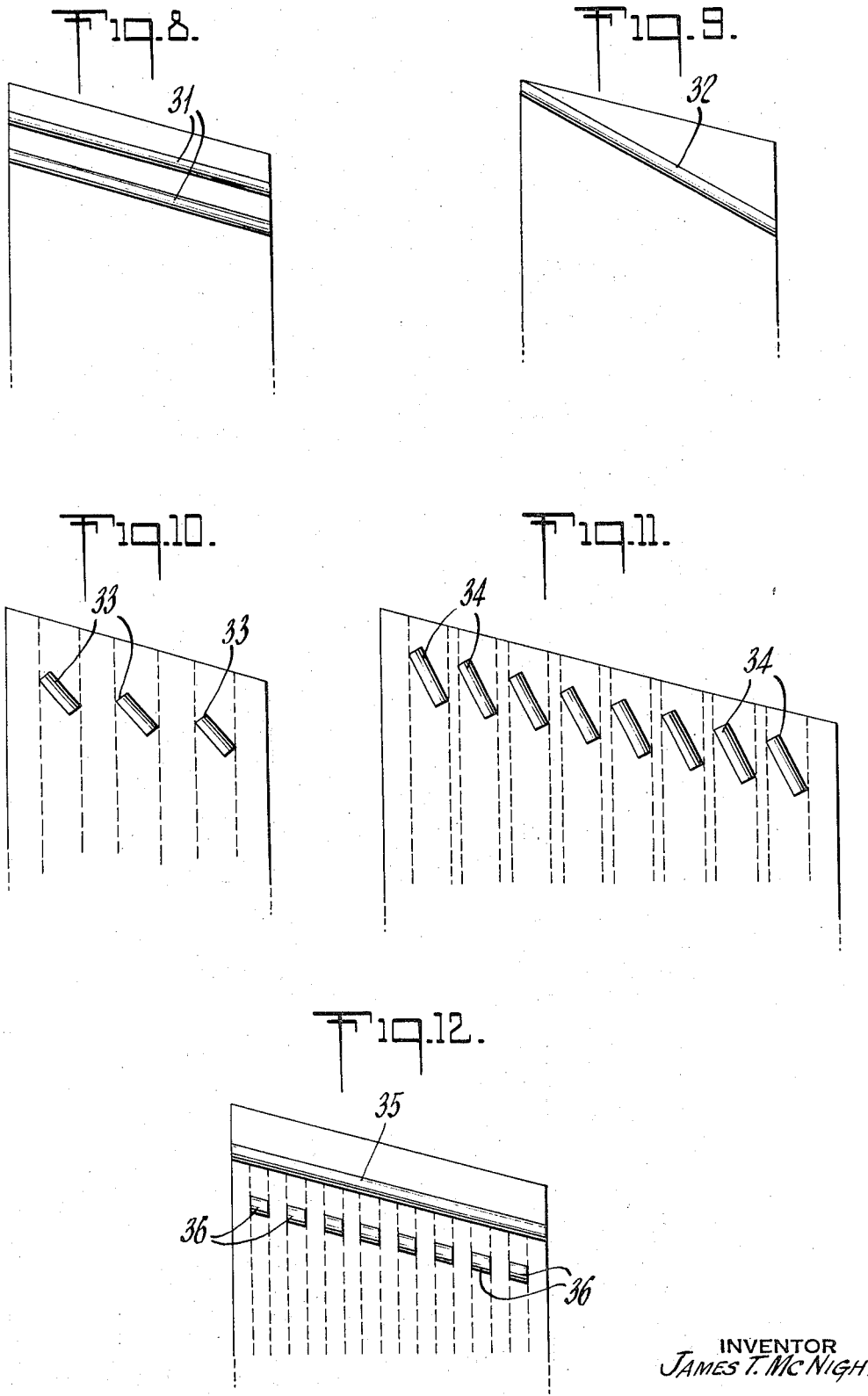

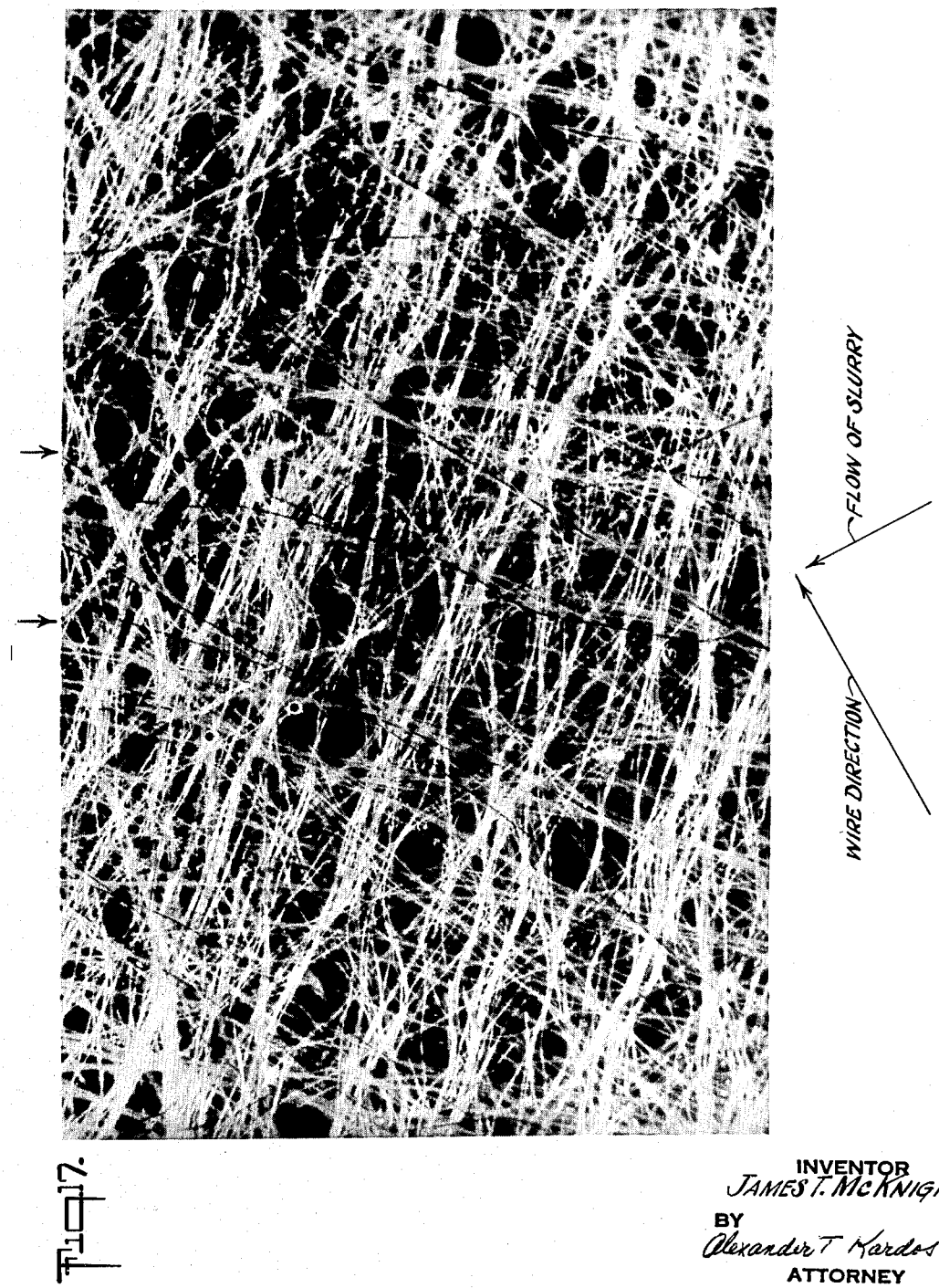

3,822,183
METHODS AND APPARATUS FOR MAKING SINGLE LAYER, PSEUDO-INTERWOVEN WET-FORMED TEXTILE FABRICS
James T. McKnight, Martinsvile, N.J., assignor to Johnson & Johnson, New Brunswick, N.J.
Filed Nov. 2, 1971, Ser. No. 194,869
Int. Cl. D21f 1/06
U.S. Cl. 162—215       10 Claims

ABSTRACT OF THE DISCLOSURE

A foraminous, wet-formed, single-layer, pseudo-interwoven textile fabric in the form of a randomly intermixed crossed lattice having a unitary structure and balanced construction comprising uncarded, relatively straight, smooth-surfaced, synthetic textile fibers having an average length of from about ⅜ inch to about 1½ inches or more, the single-layer, pseudo-interwoven textile fabric having two major axes of predominant fiber orientation directed at angles to each other, a preponderance of the fibers being arranged in generally parallel arrays of bundles which are generally oriented in the direction of one of the two major axes of predominant fiber orientation, the arrays of bundles being pseudo-interwoven with each other in a single layer, forming a randomly intermixed crossed lattice. Also included are methods and apparatus for making such foraminous, wet-formed, single-layer, pseudo-interwoven textile fabrics comprising: forming a substantially uniform aqueous slurry containing synthetic fibers having an average length of from about ⅜ inch to about 1½ inches or more; causing the aqueous slurry of fibers to flow at a predetermined velocity in a thin, flat, sheet-like, laminar, planar configuration; angularly deflecting the flowing aqueous slurry of fibers; angularly discharging the aqueous slurry of fibers upon a moving forming surface having a predetermined velocity; and forming thereon a foraminous, single-layer, pseudo-interwoven fibrous structure in the form of a randomly intermixed crossed lattice.

BACKGROUND

Many people have been engaged for many years in the manufacture of nonwoven or other textile fabrics which can be made without resorting to the spinning, twisting, and twining of individual fibers into yarns and strands, and the subsequent weaving, knitting, or other fabricating of these yarns and strands into fabrics.

Such nonwoven or other textile fabrics have usually been manufactured by laying down one or more fibrous layers or webs of textile length fibers by dry textile carding techniques which normally align the majority of the individual fibers more or less generally lengthwise of the fibrous layer or web being prepared.

The individual textile length fibers of these carded fibrous webs are then bonded by conventional bonding techniques, such as, for example, by intermittent print pattern bonding, whereby a unitary, self-sustaining nonwoven textile fabric is obtained.

Such manufacturing techniques, however, are relatively slow and it has always been desired that manufacturing processes having greater production rates be devised. Additionally, it is to be noted that such dry textile carding and bonding techniques are normally applicable only to fibers having a textile cardable length of at least about ½ inch, and preferably longer, and are not applicable to short fibers such as wood pulp fibers which have very short lengths of from about ⅙ inch down to about 1/25 inch or less.

More recently, people have been engaged in the manufacture of nonwoven textile fabrics by wet-forming techniques on conventional or modified papermaking or similar machines. Such manufacturing techniques advantageously have much higher production rates and are also applicable to very short fibers such as wood pulp fibers. Unfortunately, however, processing difficulties are often encountered in the use of the longer textile length fibers in such wet-forming manufacturing techniques.

One of the most intransigent problems of nonwoven textile fabric manufacture is the inherent undesirable tendency of all fibrous web forming processes using textile length fibers to produce a fabric having a majority of the fibers oriented in the machine or long direction. This is particularly true for light-weight fibrous webs produced at relatively higher speeds. This unidirectional character is a familiar feature of carded fibrous webs and of wet-formed fibrous webs using the classic papermaking machine arrangement.

Attempts have been made previously to produce cross-oriented fibrous webs of textile length fibers by laminating, needling, or otherwise bonding cross-lapped card webs but such procedures have failed to achieve a unitary structure, or good opacity and covering power, or sufficiently high production speeds. Specifically, in many of these attempts, it has been particularly noted that the cross-lapped fibrous webs do not satisfactorily form an integral or unitary structure, and considerable delamination problems have resulted in which the cross-lapped fibrous webs have undesirably separated from one another. Also, in many cases it has been noted that the cross-lapped fibrous webs do not possess sufficient opacity and covering power. This is particularly true if the webs are hydraulically rearranged into predetermined patterned apertured nonwoven textile fabrics containing apertures by processes and apparatus more particularly described in U.S. Pat. 2,862,251 which issued Dec. 2, 1958 to F. Kalwaites.

Although the pseudo-interwoven textile fabrics of the present inventive concept contain pores or openings, they are extremely small in diameter and are also located at random, whereby the opacity or covering power of the resulting pseudo-nonwoven textile fabric is not substantially diminished.

More recently, efforts have been directed toward the preparation of wet-formed nonwoven textile fabrics from textile length fibers wherein there is used a papermaking machine equipped with two head boxes provided with wide, relatively flat, shallow delivery trays for the aqueous fiber slurries. Excellent wet-formed nonwoven textile fabrics are produced but it is to be noted that there must always be two separate deliveries of aqueous fiber slurries having sheet-like planar configurations onto the Fourdrinier wire or other carrying surface. Such efforts form a nonwoven textile fabric having two tightly assembled intermingled and interentangled fibrous portions which are described in greater detail in copending U.S. Patent Application Ser. Nos. 143,060 and 143,061, filed May 13, 1971 and reference thereto is incorporated herein.

Such a nonwoven textile fabric, as produced and described in said patent applications, even though its two portions are tightly assembled and the individual fibers thereof are intermingled and interentangled, is nevertheless still formed in two separate operations requiring two wide, relatively flat, shallow delivery trays and, precisely speaking, the resulting product is not a single layer textile fabric having the typical crossed lattice appearance of a woven fabric.

THE INVENTIVE CONCEPT

It has been found that foraminous, wet-formed single-layer, pseudo-interwoven textile fabrics generally having the typical crossed lattice appearance of a woven fabric may be produced by forming a substantially uniform aqueous slurry containing synthetic fibers having an average length of from about ⅜ inch to about 1½ inches or more; causing the aqueous slurry of fibers to flow at a predetermined velocity in a thin, flat, sheet-like, planar configuration; angularly deflecting the flowing aqueous slurry of fibers; angularly discharging the aqueous slurry of fibers upon a moving forming surface having a predetermined velocity; and forming thereon a foraminous, single-layer, pseudo-interwoven fibrous structure in the form of a randomly intermixed crossed lattice.

In the following specification and accompanying drawings, there are described and illustrated preferred embodiments of the invention but it is to be understood that the inventive concept is not to be considered limited to the embodiments disclosed, except as determined by the scope of the appended claims.

BRIEF DESCRIPTION OF THE DRAWINGS

Referring to the accompanying drawings:

FIG. 1 is a simplified schematic plan drawing showing a typical flow diagram of a portion of a wet-forming manufacturing apparatus and process, representing a relatively simple embodiment of the present inventive concept;

FIG. 2 is an enlarged drawing of a cross-sectional view of a delivery tray which is part of the apparatus of FIG. 1, taken on the line 2—2 thereof, in the direction indicated by the arrows;

FIG. 3 is a cross-sectional view of a portion of the apparatus of FIG. 1, taken on the line 3—3 thereof, in the direction indicated by the arrows, showing the deflecting means located in the delivery tray;

FIGS. 4 and 5 are simplified schematic drawings showing a reasonable explanation of the theory involved in the various changes which occur in the fiber configuration and orientation at several stages during the manufacturing process;

FIG. 6 is a simplified schematic drawing showing several different bands of fiber orientations as they progress during the manufacturing process;

FIG. 7 is a simplified schematic drawing showing the sequence of the development of the pseudo-interweaving of the fibers during the manufacturing process;

FIGS. 8 through 12 are simplified schematic plan drawings showing several different modifications of the deflecting means located in the delivery tray;

FIG. 17 is a photomicrograph of the foraminous, wet-formed, single layer, pseudo-interwoven textile fabric of the present invention, at an enlargement of approximately 70 to 1.

DESCRIPTION OF THE PROCESS AND APPARATUS OF THE INVENTION

Figure 13:
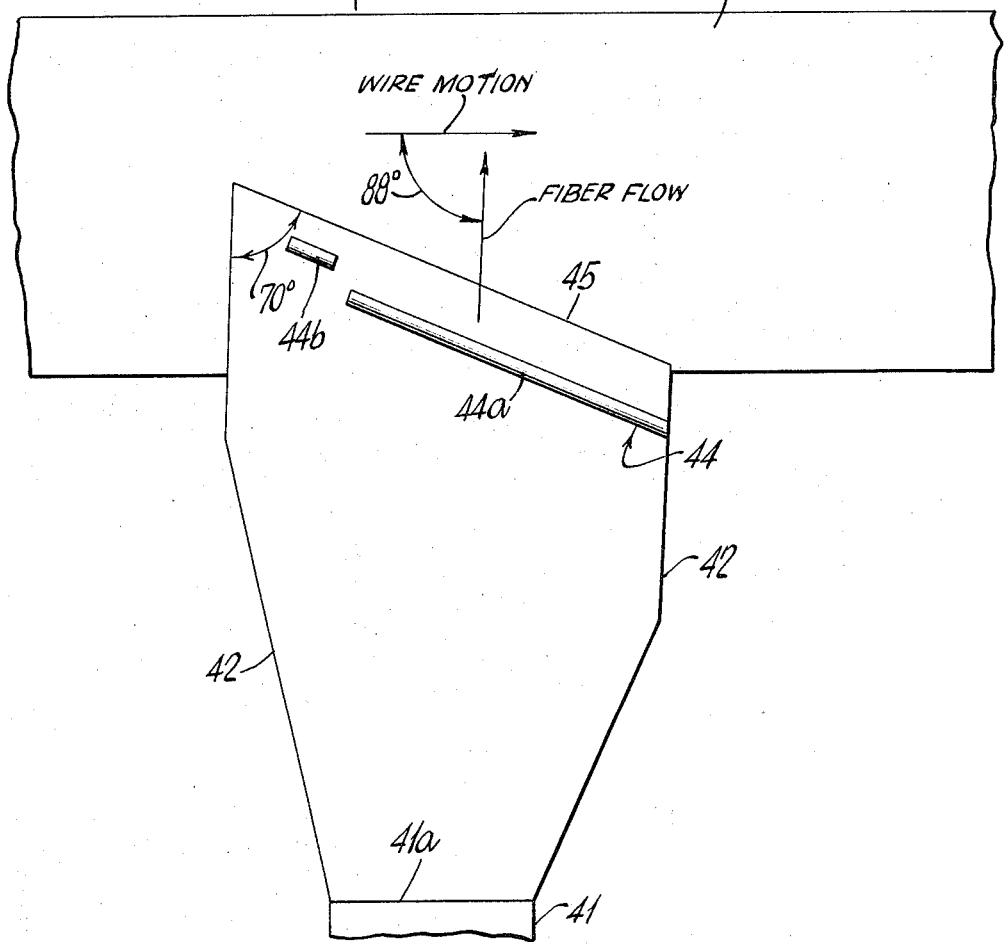
FIG. 13 is a simplified schematic plan drawing showing a modification of the apparatus of FIG. 1 utilizing another modification of the deflecting means.

With particular reference to FIG. 1, there is schematically shown a portion of a wet-forming manufacturing apparatus 20 comprising a conventional dispersion tank 21 wherein a substantially uniform aqueous slurry of fibers is formed.

FIBERS USED

The fibers which are dispersed in the dispersion tank 21 may comprise 100% uncarded, relatively straight, smooth-surfaced synthetic textile length fibers having an average length of from about ⅜ inch to about 1½ inches or more, or, if so desired or required, the dispersion may comprise a mixture of at least about 90% by weight of such textile length synthetic fibers and less than about 10% by weight of relatively unbeaten and unrefined short fibers having an average length of from about ⅙ inch (0.167) to about ¹⁄₂₅ inch (0.040 inch) or less.

TEXTILE LENGTH SYNTHETIC FIBERS

The textile length fibers may be selected from a large group of synthetic or man-made fibers such as: the cellulosic fibers, notably regenerated cellulose (both vicose and cuprammonium processes), cellulose acetate, and cellulose triacetate; the non-cellulosic fibers such as: the polyamide fibers, notably nylon 6,6 and 6; the polyesters, notably "Dacron," "Fortrel" and "Kodel"; the acrylics, notably "Creslan," "Acrilan" and "Orlon"; the modacrylics, notably "Dynel" and "Verel"; the polyolefins, especially polypropylene and polyethylene, notably "Vectra" and "Herculon"; the spandexes, notably "Lycra" and "Unel"; the fluorocarbons, notably "Teflon" TFE and FEP; etc. These fibers may be used by themselves, or in various combinations and blends of two or more species in varying percentages, as desired or required.

The denier of the synthetic or man-made textile length fibers may be varied relatively widely, depending on the circumstances, and vary from about 1½ denier to about 6 denier, with lower deniers to about 1 or less, and higher deniers to about 9, 15, or more, being of use in special circumstances.

SHORT FIBERS

The remaining fibers of the aqueous dispersion, if other fibers are used, are wood pulp fibers or other short fibers.

Unbeaten or unrefined wood pulp fibers, or at least relatively unbeaten or unrefined wood pulp fibers, are preferably used inasmuch as beating and refining are rather severe mechanical treatments, and beat and macerate the fibers whereby enhanced hydration bonding is obtained in the final product which is not desired in the present inventive concept and which leads to a product which undesirably has increased stiffness, harshness and a papery hand.

However, in some circumstances, it may be desired to include a small amount, say, up to about 10% by weight of thoroughly beaten, thoroughly hydrated fibrillated wood pulp fibers which will act as a bonding agent, in order to unify the pseudo-interwoven textile fabric and to increase its cohesive properties.

Although softwood sulfate pulp will be disclosed as the preferred type of wood pulp fiber used in the application of the present invention, substantially any type of wood pulp, either hardwood or softwod, is of use. Examples of other types of wood pulp are: sulfite pulps in which the cooking liquor, calcium or magnesium bisulfite, is acid, or sodium sulfite which is neutral or slightly alkaline; soda pulps in which the cooking liquor, caustic soda is alkaline; kraft or sulfate pulps in which the cooking liquor, sodium hydroxide and sodium sulfide, is alkaline, etc.

Although wood pulp fibers are preferred in the application of the present inventive concept, other short fibers or fibrous materials are of use. Examples of such short fibers or fibrous materials having lengths of from about ⅙ inch to about ¹⁄₂₅ inch or less are: cotton linters, bagasse, flax, jute, straw, bamboo, esparto grass, rayon, and the like.

It is essential that all the fibers used in the application of the principles of the present invention be capable of being dispersed substantially uniformly in the aqueous slurry. The concentration of the fibers in the fiber dispersion varies widely and normally is in the range of from about 0.02% by weight to about 0.2% by weight, based on the dry weight of the fibers. Greater or lesser fiber concentrations may be used for special circumstances.

DISPERSION AIDS

Dispersion aids are used in the aqueous slurry in order to assist or promote the desired uniformity of fiber dispersion. Examples of such dispersion aids are: collagen; "Cytame 5" and "Cytame 6," which are water-soluble synthetic anionic polyacrylamide linear polymers having extremely high average molecular weights of about 15 million; "Polyox" FRA and "Polyox" Coagulant, which are water-soluble ethylene oxide polymers having an average molecular weight of about 7 million and 5 million, respectively; "Reten" 210, which is a synthetic, strongly cationic polyamine having an average molecular weight of at least about 1 million; etc.

The concentration of the dispersion aid in the aqueous slurry varies widely depending on the type and concentration of the fibers used, the effectiveness of the dispersion aid itself, the dispersing effect desired or required, etc. Normally, from about 5 parts per million to about 500 parts per million of dispersion aid, based on the weight of the aqueous dispersion, is satisfactory with lesser or greater concentrations being of use in special circumstances.

THE DELIVERY TRAY

Having formed the substantially uniform, aqueous dispersion or slurry of fibers in the dispersion tank 21, the aqueous slurry is then delivered through the discharge portion 21a of the dispesion tank to a relatively flat, shallow delivery tray 22. The delivery tray 22 is best shown in FIGS. 1 and 2 and it is to be noted that its width is many times its depth whereby the aqueous slurry of fibers which flows therein possesses a laminar flow substantially in a flat, sheet-like plane. Turbulence, eddy currents, and other disruptive effects are reduced to a minimum.

The ratio of the width of the delivery tray to its depth, or more importantly the ratio of the width of the aqueous slurry therein to its depth is normally on the order of at least about 20 to 1 and preferably 100 to 1, or even higher. For example, delivery trays having a width of about 36 inches normally carry an aqueous slurry having an average depth of from about ¼ inch to about ¾ inch which are equivalent to width:depth ratios of 144:1 and 48:1, respectively.

For very large commercial installations employing very wide Fourdrinier wires, it is advisable to use very wide delivery trays which may be as wide as about 40 feet and wherein the fiber slurry may have a depth of as litle as ¼ inch to ½ inch. Such an arrangement would create a width to depth ratio as high as 1920:1 or 960:1, respectively. Such an arrangement would provide for the discharge of very large volumes of fiber slurry at relatively low slurry velocities and thus create smooth, even, non-turbulent flow.

The length of the delivery tray 22, when combined with the length of the discharge portion of the dispersion tank 21, should be long enough to provide a smooth, nonturbulent flow in the slurry as it moves to the end portion of the delivery tray 22. Under normal circumstances, a length of at least about 1 or 2 feet is sufficient.

The velocity of the fibers of the aqueous slurry in the delivery tray 22 may also be varied relatively widely and normally is in the range of from about 65 feet per minute to about 260 feet per minute and preferably from about 120 to about 200 feet per minute. The velocity of the fibers as they move in the delivery tray is an important factor affecting the properties and characteristics of the resulting pseudo-interwoven textile fabric.

The delivery tray 22 is positioned with its longitudinal axis directed angularly with respect to the direction of movement of a Fourdrinier wire 23 which is located immediately adjacent thereto, whereby the flat, sheet-like planar flow of the aqueous slurry and the fibers therein approach the Fourdrinier wire 23 at a predetermined angle $\alpha$. The delivery tray 22 is adjustably or rotatably mounted so that it can be positioned at various angles to the Fourdrinier wire 23 so that the angle of approach $\alpha$ of the aqueous slurry can be selectively predetermined for reasons to become clear from the description which follows. As shown in FIG. 1, the angle of approach of the fiber slurry is 90 degrees but this angle is merely illustrative of one embodiment of the invention and is not to be construed as limitative thereof.

In general, angles of approach $\alpha$ fall within the range of from about 75 degrees to about 105 degrees, and preferably from about 85° to about 95°, as measured clockwise with respect to the long axis of the Fourdrinier wire, and depend upon many factors, primarily the velocity of the aqueous slurry in the delivery tray, and particularly the velocity of the Fourdrinier wire.

The angle of approach $\alpha$ is an important factor affecting the properties and characteristics of the resulting nonwoven textile fabric.

THE DEFLECTING MEANS

Extending across the full width of the delivery tray 22 shown in FIG. 1, but located angularly with respect to the direction of primary flow of the aqueous slurry is a deflecting dam or bar 24. As shown more clearly in FIG. 3, the deflecting dam or bar 24 has a cylindrical cross-section and is provided with fairing or stream-lining portions 26, 26 to smooth out the flow of the aqueous slurry thereover and to minimize the creation of turbulence, swirling and eddy currents as the aqueous slurry passes over the deflecting bar, 24.

The deflecting bars and the fairing or stream-lining thereabout are so constructed as to prevent any portion of the aqueous fiber dispersion from flowing under the deflecting bar.

As shown in FIG. 1, the deflecting bar 24 is positioned at an angle of about 74° to the longitudinal axis of the delivery tray 22 but it is to be appreciated that other angles in the range of from about 25° to about 80° may also be used and preferably from about 65° to about 75°. As will be explained in greater detail hereinafter, the more acute the angle is within certain limits, then normally the greater is the deflecting effect thereof on the aqueous slurry of fibers passing thereover.

The deflecting bar 24 may be rectangular, cylindrical or oval in cross section and may be as small as about ⅛ inch in height, or it may be as large as about 1½ inches in height, or even more, depending upon the velocity and the depth of the aqueous fiber slurry flow. Preferably, the deflecting bar has a height of from about ½ inch to about 1 inch. As will be explained in greater detail hereinafter, the deflecting bar 24 consists of any one or more of several elements which are capable of producing a sharp change in the vertical direction in the flow of the aqueous fiber slurry. It should also be capable of producing a significant slurry flow at an angle usualy of about 60° or more to the primary direction of fiber flow in the delivery tray, as it existed prior to passing over the deflector bar.

THE DISCHARGE END OF THE DELIVERY TRAY

The delivery tray 22 extends beyond the deflecting bar 24 normally by a distance of from about ½ inch to about 12 inches, but not greater than a distance of about 3 feet, and terminates in a front or discharge end 25. The discharge end 25 is preferably but not necessarily parallel to the deflecting means.

The front or discharge end of the delivery tray 22 preferably possesses an angular edge 25 whereby the aqueous slurry is capable of being delivered substantially uniformly across the full width of the Fourdrinier wire 23. Such an angular cut to the front edge of the delivery tray 22 serves to deposit on the Fourdrinier wire a substantially uniform array of fibers across the width of the Fourdrinier which normally would not be possible if all the aqueous slurry were to be delivered at one edge of the Fourdrinier wire 23 and compelled to flow completely across the full width thereof.

The use of such an angular front edge 25 is of particular advantage when very wide Fourdrinier wires are used. The advantages are, of course, less when medium width Fourdrinier wires are used and may be dispensed with completely for narrow Fourdrinier wires. As shown, the front edge 25 is cut at an angle β of about 74° to the longitudinal axis of the delivery tray 22 but this angle β may be changed within a range of from about 30° to about 90°, as measured normal to the fiber flow, as desired or required, depending on the factors mentioned hereinbefore, and particularly the velocity of the aqueous fiber slurry, as well as the width and the velocity of the Fourdrinier wire and the height and placement of the deflector means.

FIBER ORIENTATION IN THE DELIVERY TRAY

As the aqueous slurry of fibers is delivered from the fiber dispersion tank 21 to the shallow delivery tray 22, it is a substantially uniform dispersion of randomly disposed fibers extending in all directions. However, as the aqueous slurry of fibers flows down the wide, relatively flat, shallow delivery tray, it assumes a non-turbulent laminar flow substantially in a flat sheet-like plane.

Consideration of the nature of the viscous laminar flow of the aqueous slurry of fibers makes it clear that the lowermost layers of the fiber dispersion flowing in the delivery tray will be flowing with a much slower velocity than the uppermost layers. As a result, any fibers which extend from one layer to another layer will be straightened out and will extend primarily in the machine or long direction. This is the state or configuration of the fibers as they flow in the delivery tray as they approach the deflector bar. A typical fiber having such a configuration is illustrated in FIG. 4 as (A).

When such fibers ultimately contact the Fourdrinier wire, two new directions of fiber motion will be introduced into the fiber dispersion to varying extents in the various layers. These two new directions of fiber motion are: (1) a movement of the fiber down through the wire at a very slow rate induced by aqueous drainage forces; and (2) a movement of the fiber at a very fast rate in the direction of the Fourdrinier wire induced by the forward velocity of the wire. However, it is to be noted that the very uppermost layers of the fiber dispersion remain essentially unaffected by the movements down through or forwardly with the Fourdrinier wire.

At the very bottom layers, the fiber orientation and the fiber flow downwardly causes the leading ends of the individual fibers to be caught by the lower layers of flow moving in the direction of the Fourdrinier wire before the trailing ends of the individual fibers are affected. The intermediate portion of the individual fibers will be affected by the flow directions of the intermediate layers which will be in a direction between the fiber flow direction and the machine direction. The result is shown in FIG. 4 which illustrates the movement of segments of the fiber in several different directions. The ultimate result, as noted in FIG. 4 (F) is a fiber orientation at an angle of about 45° (rearwardly) if the Fourdrinier wire and aqueous slurry speeds are in the proper velocity ranges.

FIG. 4 shows (B) the leading end (a) of an individual fiber being caught in the moving Fourdrinier wire. Then, as the Fourdrinier wire continues to move forwardly, or to the right in FIG. 4, while the aqueous slurry continues to move forwardly, or upwardly in FIG. 4, the free trailing end (b) of the fiber is moved around the snagged leading end as noted in (C), (D) and (E), until the individual fiber finally ends up in the 45° (rearward) relationship, as noted in (F).

An additional orienting flow direction is involved in the delivery tray and is achieved by the incorporation of the deflecting bar which is positioned at an angle to the primary flow direction of the aqueous slurry. The new orientation direction is achieved in the intermediate layers of the fiber dispersion and a typical fiber having such a configuration is illustrated in FIG. 5 as (B). This is the fiber orientation produced by the deflector bar.

FIG. 5 shows (B) the leading end (a) of an individual fiber being caught in the moving Fourdrinier wire. Then as the Fourdrinier wire continues to move forwardly, or to the right in FIG. 5, while the aqueous slurry continues to move forwardly, or upwardly in FIG. 5, the free trailing end (b) of the fiber is moved around the snagged leading end as noted in (C) and (D) until the individual fiber finally ends up with the major portion of its length in the 45° (forward) relationship, as noted in (E).

The two individual fibers of FIGS. 4 and 5 thus end up in crossed lattice-like relationship and thus resemble generally the crossing warp and filling fibers of a woven fabric construction.

FIG. 6 schematically illustrates the two primary fiber orientations in the delivery tray subsequent to passage of the aqueous slurry over the deflector bar and shows how bands of fibers having different orientations are deposited successively on the Fourdrinier wire to form a foraminous, single-layer, pseudo-interwoven textile fabric in the form of an intermixed crossed lattice.

FIG. 7 schematically illustrates in greater detail the theory of the formation of such a single-layer pseudo-interwoven textile fabric. Fiber bundle or Fiber A is laid down first on the Fourdrinier wire. Fiber bundle or Fiber B is laid down next on top of Fiber bundle or Fiber A. Fiber bundle or Fiber C is then laid down on top of Fiber bundles or Fibers A and B. This continues until all the fiber bundles and Fibers (A through J) are laid down successively on top of one another. The result is schematically shown in FIG. 7 and the pseudo-interweaving effect to be noted. The creation of such an intimate crossing over of the fiber bundles and fibers provides for a closely arranged non-delaminating unitary structure.

It is to be emphasized that the creation of the wet-formed single-layer, pseudo-interwoven textile fabric is not an instantaneous operation but is rather a progressive sequential operation. More specifically, it is to be noted that the pseudo-interweaving is created as the individual fibers or fiber bundles are deposited in sequence on the Fourdrinier wire as it moves progressively through the intersecting crossing flow of the aqueous slurry of fibers.

In FIG. 7, it is to be observed that the fiber bundles or fibers extend approximately at right angles to each other. This is, of course, the preferred angular relationship and provides an appearance most closely resembling a standard convention woven textile fabric.

THE FOURDRINIER WIRE

The Fourdrinier wire 23 passes directly immediately under the discharge end of the delivery tray 22 and is sufficiently close thereto, as measured in the vertical direction, as to substantially reduce the "fluid head" of the aqueous slurry to a matter of less than about ½ inch of "fluid head," or preferably even less, and to thereby minimize the "waterfall" effect of the slurry as it is delivered from the delivery tray 22 to the Fourdrinier wire 23. This also serves to lessen the turbulence, swirling and eddying in the aqueous slurry in the area of aqueous slurry transfer and to reduce the tendency of the fibers to move about into undesired orientations.

The Fourdrinier wire is a standard or conventional finely woven metal or synthetic fiber cloth which permits rapid drainage of water but retains fibers. The mesh size is preferably relatively coarse and is in the range of from about 15 mesh to about 120 mesh.

The velocity of the Fourdrinier wire 23 may be varied relatively widely but is normally in the range of from about 90 feet per minute to about 260 feet per minute, and preferably at least about 120 feet per minute. Higher or lower speeds may be used for special circumstances.

FORMATION OF FIBER BUNDLES

An additional feature and result of the fluid and fiber interaction between (1) the substantially planar flow of the aqueous slurry and (2) the operating variables of slurry velocity, angle of approach, and Fourdrinier velocity and surface characteristics is the formation of the individual fibers into substantially parallel arrays of bundles or groups of fibers aligned generally in the primary directions of predominant fiber orientation.

These fiber bundles are of continuous length and extend angularly generally from one side of the textile fabric to the other side. Usually, for any one particular direction of fiber orientation, there are at least about 20 fiber bundles per inch. Normally, they are approximately parallel and are spaced from one another by a distance of from about 0.2 to about 1.5 mm., center-to-center. Each bundle contains from about 3 to about 200 or more individual fibers with approximately 50% of the fibers in a bundle in multipoint, almost continuous contact for a distance of ¼ inch or more. The bundles have an approximate range of diameters of from about 0.04 millimeter to about 0.6 or 1 millimeter or more. Within a given fibrous structure, approximately 50% of the fibers in a given fiber bundle may participate in branching from one bundle to other adjacent bundles in a length of about ¼ inch. This branching is at an angle of about 35% or less to the primary direction of predominant fiber orientation. Other than that small portion of their length which is proceeding from one fiber bundle to other adjacent fiber bundles, the fibers in the primary fiber bundles are in multipoint, almost continuous contact with the same adjacent fiber or fibers for a distance of about ¼ inch or more. These continuous fiber bundles run the entire length and width of the pseudo-interwoven textile fabric. The adjacent parallel fiber bundles are also linked by from about 20 to about 200 fibers in a distance of about ¼ inch at an angle of about 60° or more to the primary direction of predominant fiber orientation. These linkages are in addition to the branching described previously. These connecting fibers which intersect the primary fiber bundles at a large angle, approaching about 90°, extend in this general direction for a large fraction of their length, perhaps as much as about ⅜ inch.

PORES OR OPENINGS OF THE FIBROUS STRUCTURE

Still another feature and result of the relationship between (1) the substantially planar flow of the aqueous slurry and (2) the operating variables of slurry viscosity, angle of approach, and velocity and surface characteristics of the Fourdrinier wire is the formation of a very large number of very small pores or openings randomly arranged or distributed in the fibrous structure. These pores or openings are so very small in diameter that, even though they are very many in number, they do not create very much open surface area, that is, fabric areas which have substantially zero or very low fiber density. As a result, the resulting fibrous structure possesses good opacity and covering power.

The determination of the number of pores or openings in the fibrous structure is a very difficult matter to determine inasmuch as the greater the magnification of the fibrous structure, then the greater is the number of pores or openings which can be detected. Basically, it resolves to a definition as to what is considered to be a "pore." Within the scope of the present invention, therefore, a pore or opening is herein defined as an area of substantially zero or very low fiber density and which possesses a diameter larger than 0.005 inch.

The fibrous structures of the present invention have substantially none, or at the very most, a very low number of pores or openings which have diameters equal to or greater than about 0.015 inch. This very low number is less than about 4% of the total number of pores or openings in the fibrous structure, and is normally on the order of about 1% or 2%.

More specifically, the vast preponderance of the randomly distributed pores or openings in the fibrous structure range in diameter from about 0.005 inch to about 0.015 inch and normally from about 0.005 inch to about 0.010 inch.

The total number of open surface areas created by the total number of pores or openings, that is, the total surface coverage of the areas which have substantially zero or very low fiber density in the fibrous structures of the present invention is less than about 10%, and more likely, on the order of less than about 5%.

The total number of pores or openings in the fibrous structure is on the order of from at least about 600 to about 1500 or more pores per square inch in the range of from about 0.005 inch to about 0.010 inch diameter, from about 100 to about 400 pores per square inch in the range of from about 0.010 inch to about 0.015 inch diameter, and from about 20 to 60 pores per square inch in the range of slightly greater than 0.015 inch diameter.

The following table sets forth these values in percentage values:

| Diameter of pores | Number of pores | Percentage |
|---|---|---|
| 0.005–0.010 | 600–1,500 | 75–85 |
| 0.010–0.015 | 100–400 | 13–25 |
| 0.015 | 20–60 | 1–4 |

It is not essential that there be only one deflector bar extending across the delivery tray. There may be a plurality of deflector means. For example, FIG. 8 discloses a modification wherein there are two deflector bars extending across the delivery tray. As noted in this figure, both deflector bars 31 and the delivery edge of the delivery tray are parallel and extend at an angle at about 74° to the primary direction of flow of the aqueous fiber slurry.

It is also not essential that the deflector bar and the delivery edge of the delivery tray be parallel. They may extend at angles to each other. As shown in FIG. 9, the deflector bar 32 extends at an angle of about 60° to the primary direction of flow of the aqueous fiber slurry whereas the delivery edge of the delivery tray extends at an angle of about 76° to the primary direction of flow of the aqueous fiber slurry.

It is also not essential that the deflector bar extend in continuous fashion all the way across the delivery tray. The deflector bar may be discontinuous and interrupted. FIG. 10 discloses such a modification wherein the deflector bar has been divided into three equally spaced segments 33. In this figure, the delivery edge of the delivery tray extends at an angle of about 72° to the primary direction of flow of the aqueous fiber slurry and the individual segments of the deflector bar extend at an angle of about 36° to the primary direction of flow of the aqueous fiber slurry.

In FIG. 10 and in subsequent figures wherein the delivery bar exists in segments, the delivery bar has a diameter of ½" and a length as desired, depending upon the width of the delivery tray and the spacing of the individual segments of the deflector bar. All the segments are covered with fairing or other stream-lining means so that the aqueous slurry passes thereover with a minimum of turbulence, swirling, or the formation of undesirable eddy currents.

FIG. 11 discloses a further modification of the embodiment illustrated in FIG. 10 and employs the deflector bar in eight separate spaced segments 34. In this modification, the delivery edge of the delivery tray extends at an angle of about 75° to the primary direction of flow and the individual segments of the deflector bar extend at an angle of about 24° to the primary direction of flow. In this modification, the deflector bar segments are cylindrical and have a diameter of ½ inch and a length of 2½ inches.

FIG. 12 discloses a combination of deflector means wherein one deflector bar 35 extends continuously all the way across the delivery tray and a second segmented deflector bar having eight segments 36 extends discontinuously in interrupted fashion across the delivery tray. In this modification, the delivery edge of the delivery tray and the deflector means are generally parallel and extend at an angle of about 73° to the primary direction of flow of the aqueous slurry.

In FIG. 13, there is set forth another modification of the deflector bar. The primary direction of flow of the aqueous fiber slurry in the delivery tray is at an angle of about 88° to the direction of movement of the Fourdrinier wire 43. The delivery edge 45 of the delivery tray 42 is formed at an angle of 70° to the primary direction of flow of the aqueous fiber slurry. The deflecting bar 44 is cylindrical and has a diameter of ⅞ inch. The main portion 44 of the deflecting bar is parallel to the delivery edge 45 of the delivery tray 42 and is spaced approximately 2½ inches therefrom. The smaller segment 44b of the deflecting bar 44 located immediately adjacent the main segment is also cylindrical and also has a diameter of ⅞ inch. It is 1 inch long and is parallel to and located approximately 1 inch from the delivery edge of the delivery tray.

Figure 14:
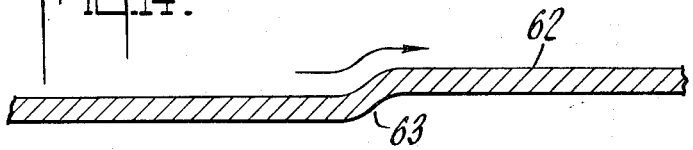
FIGS. 14–16 are simplified schematic cross-sectional drawings of the bottom surface of the delivery tray with the arrows indicating the direction of the flow of the aqueous fiber slurry therein and wherein the changes in curvature constitute deflection means located angularly in the bottom surface of the delivery tray having angles to the fiber flow similar to the angular relationship and configuration of the previously described deflecting means.
Figure 15:
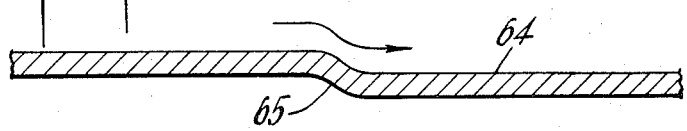
Figure 16:
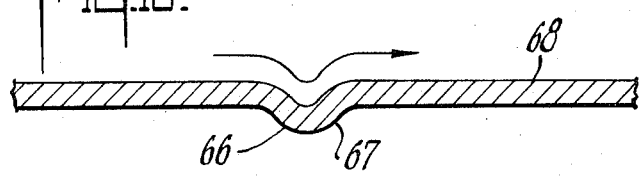

It is not essential that a separate element such as a deflecting bar be used in conjunction with the delivery tray in order to deflect the aqueous fiber slurry flow in the delivery tray. FIGS. 14, 15 and 16 are cross sectional views and disclose variations in which the floor of the delivery tray 62 has been modified in order to yield equivalent results.

FIG. 14 shows a step or bend 63 upwardly in the floor of the delivery tray and FIG. 15 shows a step or bend 65 downwardly in the floor of the delivery tray 64. When these bends are located angularly across the width of the delivery tray, they will deflect the aqueous fiber slurry as desired.

The height of the step or bend 63 in FIG. 14 and the depth of the step or bend 65 in FIG. 15 is in the range of from about ⅛ inch to about 1½ inches and preferably is in the range of from about ½ inch to about 1 inch. The slope and curvature of the steps or bends should be smooth and stream-lined and should not be sharp or abrupt as to produce undesirable turbulence, swirling, or eddy currents.

In FIG. 16, there is disclosed a step or bend 66 downwardly and a step or bend 67 upwardly in the floor of the delivery tray 68 whereby the aqueous fiber slurry can be deflected as desired.

The magnitude of the steps or bends 66 and 67 in FIG. 16 are in the same size range and are of the same smooth shape and configuration as the previously described steps or bends 63 and 65 of FIGS. 14 and 15.

In FIG. 17, there is shown a photomicrograph of a typical single-layer, pseudo-interwoven, wet-formed textile fabric of the present invention. The structure is well described as a bimodal oriented array of fibers and fiber bundles in the form of a randomly intermixed crossed lattice, basically made by depositing fibers and fiber bundles with two different primary orientations in the order generally as described with reference to FIG. 7.

The net result is that only a small fraction of the fibers or fiber bundles reside completely in the outermost surface, that is, only fibers "A" and "J" in FIG. 7. The majority of the fibers, that is, fibers "B" through "I" are crossed at about right angles by many other fibers passing on either side of a given fiber or fiber bundle. In this way, there is produced a fibrous structure with a significantly improved unitary construction relative to crosslaying to separate webs each of which is oriented only in one direction.

In FIG. 17, starting with the upper center area located between the arrows, it is to be noted that there are black tracer fibers which run primarily vertically and pass in a random fashion over some fibers and under other fibers which are oriented at an angle of about 70° to about 110° to the direction of orientation of the black tracer fibers. Similarly those white fibers which have been marked with an "X" or an "O" cross over and then under vertically oriented fibers including the black tracer fibers. Thus, fibers running in both of the two principal directions of the fibrous structure are interwoven with crossing fibers and these are similarly interwoven with other fibers running in the other direction. It is also to be noted that there are very few, if any, fibers on the upper surface of the fibrous structure which are not crossed at a large angle by at least one other fiber bundle.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

Example I

The apparatus illustrated in FIG. 13 of the drawings is used. Standard finished ¾ inch, 1.5 denier tow cut rayon fibers are dispersed in the dispersing tank to a fiber consistency of 0.1% by weight on a dry fiber basis in the slurry by means of gentle, non-turbulent moderate stirring of a large beater bar. Sixty parts per million of a dispersion aid, "Cytame 6," is used to assist in the formation of a uniform dispersion of the fiber.

The fiber dispersion is delivered from the dispersion tank to a flat, shallow delivery tray having a front delivery edge cut at an angle of 70°. The flow rate of the fiber dispersion in the delivery tray is about 5 liters per second. The width of the delivery tray is 3 feet in the area immediately preceding the deflector bar and the depth of the fiber dispersion in the delivery tray is between ¼ inch and ½ inch. The slurry width:depth ratio is from about 72:1 to about 144:1. The velocity of the fiber slurry is approximately 120 feet per minute. The delivery tray is positioned at an angle of about 88 degrees as measured clockwise to the direction of movement of the closely adjacent Fourdrinier wire which is travelling at velocity of about 154 feet per minute.

The fiber slurry has a substantially flat, sheet-like planar flow as it approaches and contacts the angularly positioned deflecting means. The deflector means is a cylindrical bar and has a diameter of ⅞ inch. Fairing and stream-lining is used as described herein. The large segment of the deflector bar extends across the delivery tray at an angle of about 70° and is parallel to the delivery edge of the delivery tray, being spaced about 2½ inches therefrom. The small segment of the deflector means is about 1½ inches in length and is also parallel to the delivery edge and is spaced about 1 inch therefrom.

The resulting fibrous structure is shown in FIG. 17 of the drawings and is described in the foregoing description. It is a typical single-layer, pseudo-interwoven textile fabric having a unitary non-delaminating construction.

Example II

The apparatus illustrated in FIG. 1 of the drawings is used. Standard finished ¾ inch, 1.5 denier tow cut rayon fibers are dispersed in the dispersing tank to a fiber consistency of 0.1% by weight on a dry fiber basis in the slurry by means of gentle, non-turbulent stirring of a large beater bar. Sixty parts per million of a dispersion aid, "Cytame 6," is used to assist in the formation of a uniform dispersion of the fiber.

The fiber dispersion is delivered from the dispersion tank to a flat, shallow delivery tray having a front delivery edge cut at an angle of 77°. The flow rate of the fiber dispersion in the delivery tray is about 5 liters per second. The width of the delivery tray is 3 feet in the area immediately preceding the deflector bar and the depth of the fiber dispersion in the delivery tray is between ¼ inch and ½ inch. The slurry width:depth ratio is from about 72:1 to about 144:1. The velocity of the fiber slurry is approximately 120 feet per minute. The delivery tray is positioned at an angle of about 88 degrees as measured clockwise to the direction of movement of the closely adjacent Fourdrinier wire which is travelling at a velocity of about 154 feet per minute.

The fiber slurry has a substantially flat, sheet-like planar flow as it approaches and contacts the deflector bar. The deflector bar is cylindrical and has a diameter of ⅞ inch. It extends completely across the full width of the delivery tray at an angle of about 74° to the direction of flow of the aqueous fiber slurry.

The results are comparable to the results obtained in Example I. The products are comparable.

Example III

The procedures of Example II are followed substantially as set forth therein with the exception that the deflection means comprises a simple ¼ inch bend or step downwardly in the floor of the delivery tray. Such construction is illustrated in FIG. 15 of the drawings. A typical single-layer, pseudo-interwoven textile fabric having a unitary non-delaminating structure is obtained.

Example IV

The procedures of Example II are followed substantially as set forth therein with the exception that the deflection means comprises a series of interrupted deflector baffles as illustrated in FIG. 11 of the drawings. The deflector baffles are cylindrical bars having a diameter of ½ inch and a length of 2½ inches each. There are eight baffles and they are set at an angle of 24° to the primary direction of flow of the aqueous fiber slurry. The delivery edge has an angle of about 75° to the primary direction of flow of the aqueous fiber slurry. A typical single-layer, pseudo-interwoven textile fabric having a unitary non-delaminating structure is obtained.

As used herein, the terms "two primary directions of predominant fiber orientation" or "two major axes" or like terms does not mean that every fiber in the fibrous structure is aligned in either of the two directions. There will be fibers and fiber bundles which are basically aligned in other directions. However, the preponderance of the fibers and fiber bundles is aligned in the two directions and other fibers and fiber bundles are definitely of a secondary or minor nature.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. A method for making foraminous, wet-formed, single-layer, pseudo-interwoven textile fabrics comprising: forming a substantially uniform aqueous slurry containing synthetic fibers having an average length of from about ⅜ inch to about 1½ inches or more; flowing said aqueous slurry of fibers in a delivery tray and at a predetermined velocity in a thin, flat, sheet-like, laminar, planar configuration; angularly deflecting said flowing aqueous slurry of fibers with a deflection dam positioned across the tray at an angle of from about 25° to about 80° to the direction of flow of said aqueous slurry, said dam having streamlining portions to smooth out the flow of the aqueous slurry thereover; and angularly discharging said flowing aqueous slurry of fibers upon a moving forming surface having a predetermined velocity; whereby there is formed thereon a foraminous, single-layer, pseudo-interwoven fibrous structure in the form of a randomly intermixed crossed lattice.

2. A method as defined in Claim 1 where the aqueous slurry of fibers is discharged onto the moving forming surface at an nagle of from about 75° to about 105°, with respect to the direction of movement thereof.

3. A method as defined in Claim 1 wherein the velocity of the aqueous slurry of fibers is from about 65 feet per minute to about 260 feet per minute and the velocity of the moving forming surface is from about 90 feet per minute to about 260 feet per minute.

4. A method as defined in Claim 1 wherein the thin, flat, sheet-like, laminar planaraqueous slurry of fibers is angularly deflected at an angle of from about 65° to about 75°.

5. Apparatus for making foraminous, wet-formed, single-layer, pseudo-interwoven textile fabrics comprising: means for forming a substantially uniform aqueous slurry containing synthetic fibers having an average length of from about ⅜ inch to about 1½ inches or more; a delivery tray for causing said aqueous slurry of fibers to flow at a predetermined velocity in a thin, flat, sheet-like, laminar, planar configuration; a deflection dam for angularly deflecting said flowing aqueous slurry of fibers, said dam being positioned at an angle of from about 25° to about 80° to the direction of flow of said aqueous slurry of fibers, said dam being positioned across said delivery tray and said dam having streamlining portions to smooth out the flow of the aqueous slurry thereover; and means for angularly discharging said flowing aqueous slurry of fibers upon a moving forming surface having a predetermined velocity, whereby there is formed thereon a foraminous, single-layer, pseudo-interwoven fibrous structure in the form of a randomly intermixed crossed lattice.

6. Apparatus as defined in Claim 5 wherein said deflection dam extends continuously across the delivery tray.

7. Apparatus as defined in Claim 5 wherein said deflection dam extends discontinuously across the delivery tray.

8. Apparatus as defined in Claim 5 wherein said deflection dam is an upwardly-directed bend or step extending across the delivery tray.

9. Apparatus as defined in Claim 5 wherein said deflection dam is a downwardly-directed bend or step extending across the delivery tray.

10. Apparatus as defined in claim 5 wherein said deflection dam is positioned at an angle of from about 65° to about 75° to the direction of flow of said aqueous slurry of fibers.

References Cited

UNITED STATES PATENTS

| | | | |
|---|---|---|---|
| 3,081,515 | 3/1963 | Griswold | 162—114 X |
| 3,085,906 | 4/1963 | Harmon et al. | 162—149 X |
| 1,799,350 | 4/1931 | Barnes | 162—304 X |
| 1,880,057 | 9/1932 | Sherman | 162—215 |
| 1,974,103 | 9/1934 | Corcoran | 162—215 |
| 2,139,874 | 12/1938 | Berry | 162—131 |
| 3,004,868 | 10/1961 | Sumner et al. | 162—157 R |
| 3,150,416 | 9/1964 | Such | 162—114 X |

ROBERT L. LINDSAY, JR., Primary Examiner

R. V. FISHER, Assistant Examiner

U.S. Cl. X.R.

162—157 R, 216, 325, 336